US012214516B2

(12) United States Patent
Hernandez

(10) Patent No.: US 12,214,516 B2
(45) Date of Patent: Feb. 4, 2025

(54) LINE-TYPE AUTO GLASS REMOVAL TOOLS FOR USE WITH AN INDEPENDENT VACUUM CUP DEVICE

(71) Applicant: Equalizer Industries, Inc., Round Rock, TX (US)

(72) Inventor: Luis Hernandez, Irving, TX (US)

(73) Assignee: Equalizer Industries, Inc., Round Rock, TX (US)

( * ) Notice: Subject to any disclaimer, the term of this patent is extended or adjusted under 35 U.S.C. 154(b) by 533 days.

(21) Appl. No.: 17/685,291

(22) Filed: Mar. 2, 2022

(65) Prior Publication Data

US 2022/0314482 A1 Oct. 6, 2022

Related U.S. Application Data

(60) Provisional application No. 63/155,879, filed on Mar. 3, 2021.

(51) Int. Cl.

*B26D 1/00* (2006.01)
*B26D 5/02* (2006.01)
*B26D 7/26* (2006.01)
*B65H 75/42* (2006.01)

(52) U.S. Cl.

CPC ......... *B26D 7/2614* (2013.01); *B26D 1/0006* (2013.01); *B26D 5/02* (2013.01); *B65H 75/42* (2013.01); *B26D 2001/008* (2013.01); *B65H 2701/36* (2013.01)

(58) Field of Classification Search

CPC .. B65H 2701/36; B26D 1/547; B26D 7/2628; B60S 5/00; B25B 11/007

See application file for complete search history.

(56) References Cited

U.S. PATENT DOCUMENTS

| | | | | |
|---|---|---|---|---|
| 7,618,023 | B2 | 11/2009 | Ericson | |
| 9,095,988 | B2 | 8/2015 | Finck | |
| 9,701,509 | B2 | 7/2017 | Davies et al. | |
| 10,569,437 | B2 | 2/2020 | Finck | |
| 10,695,926 | B2 | 6/2020 | Rodger | |
| 2006/0117573 | A1 * | 6/2006 | Jensen | B26B 27/002 30/286 |
| 2007/0040415 | A1 | 2/2007 | Ericson | |
| 2013/0037648 | A1 | 2/2013 | Finck | |
| 2016/0194175 | A1 | 7/2016 | Davies et al. | |
| 2017/0266830 | A1 | 9/2017 | Rodger | |

(Continued)

FOREIGN PATENT DOCUMENTS

| | | | |
|---|---|---|---|
| DE | 102012113147 | A1 | 7/2014 |
| DE | 202017101001 | U1 | 4/2017 |

(Continued)

*Primary Examiner* — Jacob K Ackun

(74) *Attorney, Agent, or Firm* — Calvert Technology Law, PLLC; Nathan H. Calvert

(57) ABSTRACT

A line-type auto glass cutout tool for use with a vacuum cup device having a vacuum cup and a base connected to the vacuum cup. The tool includes a tool body with a first winding spool mounted on the tool body for rotation about a first spool axis relative to the tool body. A first drive element is coupled to the first winding spool to rotate with the first winding spool about the first spool axis. The auto glass cutout tool also includes an attachment arrangement for releasably securing the tool body to the vacuum cup device in a tool operating position.

18 Claims, 11 Drawing Sheets

(56) References Cited

U.S. PATENT DOCUMENTS

| | | | | |
|---|---|---|---|---|
| 2018/0370056 | A1 | 12/2018 | Finck | |
| 2019/0152086 | A1* | 5/2019 | Dickerson | B26D 1/547 |
| 2020/0086518 | A1* | 3/2020 | Boehmer | B26D 1/547 |
| 2020/0198165 | A1 | 6/2020 | Hauser et al. | |
| 2023/0150161 | A1* | 5/2023 | Dick | B26D 1/547 29/281.1 |

FOREIGN PATENT DOCUMENTS

| | | | |
|---|---|---|---|
| DE | 202018003949 | U1 | 12/2018 |
| EP | 2540463 | B1 | 11/2014 |
| EP | 3227066 | B1 | 10/2019 |
| FR | 2968264 | B1 | 3/2013 |
| GB | 2511108 | B | 3/2016 |
| GB | 2489835 | B | 9/2016 |
| KR | 101210307 | B1 | 12/2012 |
| KR | 101650834 | B1 | 8/2016 |
| KR | 101720564 | B1 | 3/2017 |
| KR | 101810434 | B1 | 12/2017 |
| WO | 2020079600 | A1 | 4/2020 |

* cited by examiner

LINE-TYPE AUTO GLASS REMOVAL TOOLS FOR USE WITH AN INDEPENDENT VACUUM CUP DEVICE

CROSS-REFERENCE TO RELATED APPLICATION

Applicant claims the benefit, under 35 U.S.C. § 119(e), of U.S. Provisional Patent Application No. 63/155,879 filed Mar. 3, 2021, and entitled "Line-Type Autoglass Removal Tools for Use with an Independent Vacuum Cup Device." The entire content of this provisional application is incorporated herein by this reference.

TECHNICAL FIELD OF THE INVENTION

The invention relates to line-type auto glass removal tools, and, more particularly, to line-type auto glass removal tools that are adapted to be temporarily connected to auto glass for a removal procedure via an independent vacuum cup device.

BACKGROUND OF THE INVENTION

Auto glass is typically sealed within a frame of the vehicle by a bead of sealant extending around the entire periphery of the piece of glass. Numerous types of auto glass removal tools are available for cutting the sealant material or otherwise breaking the seal so that the glass may be removed from the frame. Tools that may be referred to generally as "line-type tools" make up one broad category of auto glass removal tools used for cutting the peripheral sealant material. These line-type tools auto glass removal tools operate by pulling a thin, flexible strand of material through the peripheral bead of sealant along the entire periphery of the glass. The thin, flexible material may comprise a metal wire or metal cable or may comprise a single strand of a suitable metal or non-metal or a multi-strand cord of suitable material. Regardless of the type of cutting line used in these line-type tools, the tools typically include one or more vacuum cups mounted on a tool body that houses a winding mechanism. The tool body is temporarily secured to a surface of the auto glass to be removed by the vacuum cup or cups and the winding mechanism is then operated to wind the cutting line onto a spool to pull the line through the peripheral sealant and thus cut the sealant.

SUMMARY OF THE INVENTION

It is an object of the invention to provide line-type auto glass removal tools that do not incorporate a vacuum cup device but are instead adapted to be secured to an independent vacuum cup device that may be operated to secure the tool to the auto glass for a glass removal operation.

Another object of the invention is to provide methods for securing a line-type auto glass tool to an independent vacuum cup device that may be used to secure the line-type auto glass tool for a glass removal operation.

As used in this disclosure and the accompanying claims an "independent vacuum cup device" comprises a vacuum cup device that includes at least a vacuum cup and a base connected to the vacuum cup but does not include a line winding mechanism. Such independent vacuum cup devices typically include some type of handle forming part of the base so that when the vacuum cup is secured to a sheet of material, the handle may be used to lift and manipulate the sheet of material. Such an independent vacuum cup device may also include a vacuum pump for applying a vacuum to the vacuum cup to temporarily secure the vacuum cup to a surface.

The various advantages and features of line-type auto glass removal tools in accordance with the invention will be apparent from the following description of representative embodiments, considered along with the accompanying drawings.

DESCRIPTION OF REPRESENTATIVE EMBODIMENTS

Figure 8:
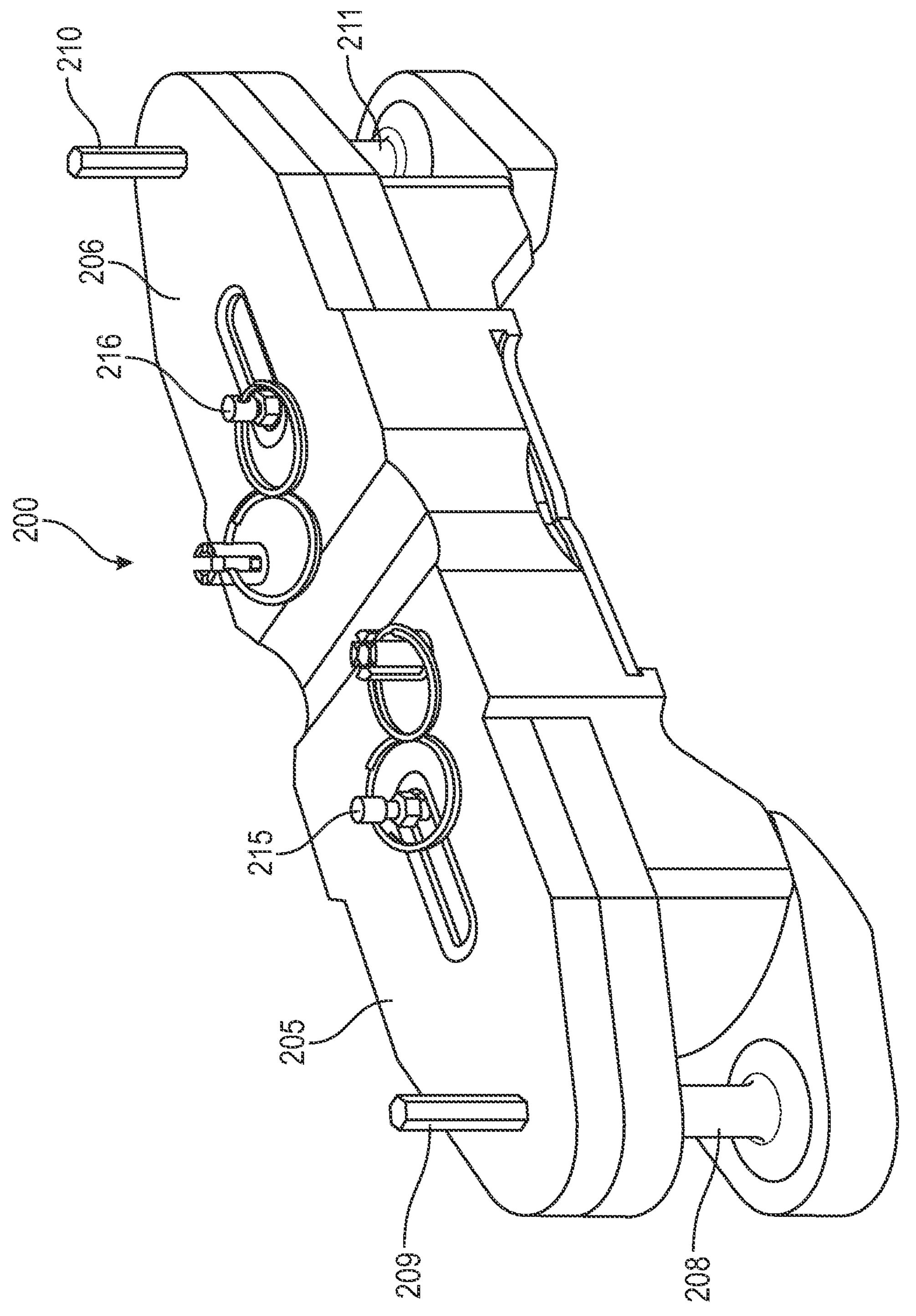
FIG. 8 is an isometric view of an alternative form of line-type auto glass cutout tool in accordance with the present invention.
Figure 9:
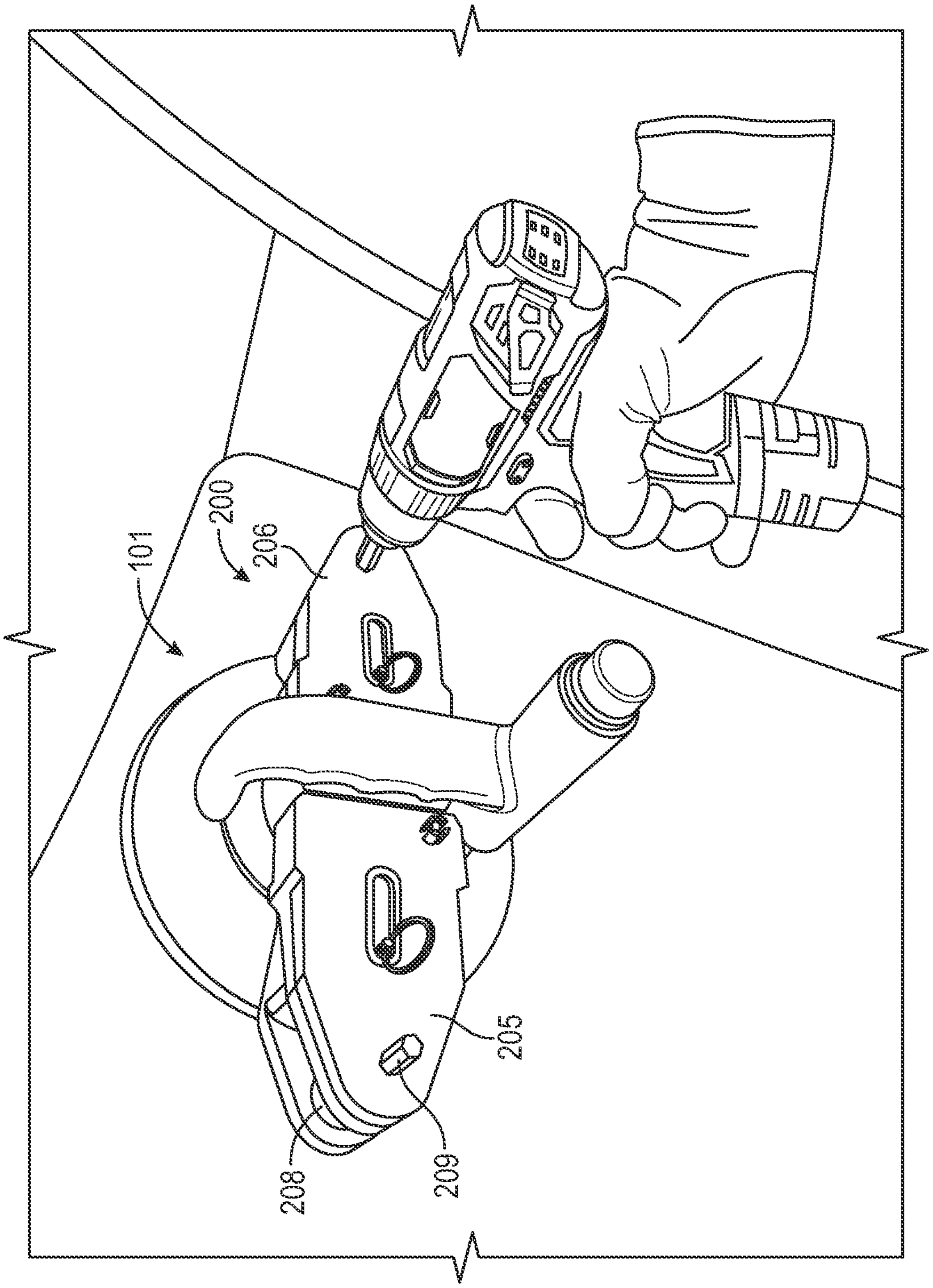
FIG. 9 is an isometric view of the tool shown in FIG. 8 mounted on an independent vacuum cup device and temporarily secured to a vehicle windshield in the course of a procedure to remove the windshield.
Figure 10:
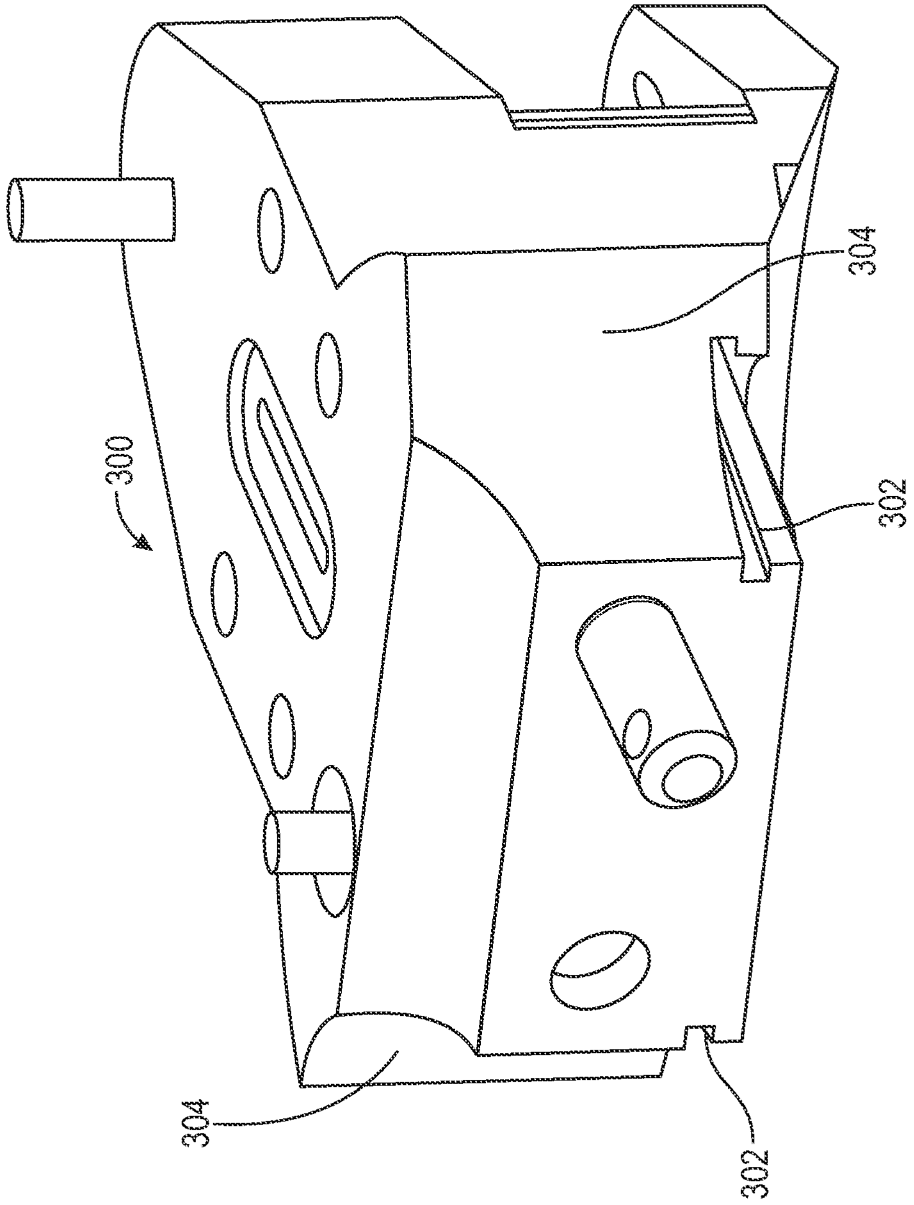
FIG. 10 is an isometric view of another alternative form of a tool body component according to an embodiment of the present invention.
Figure 11:
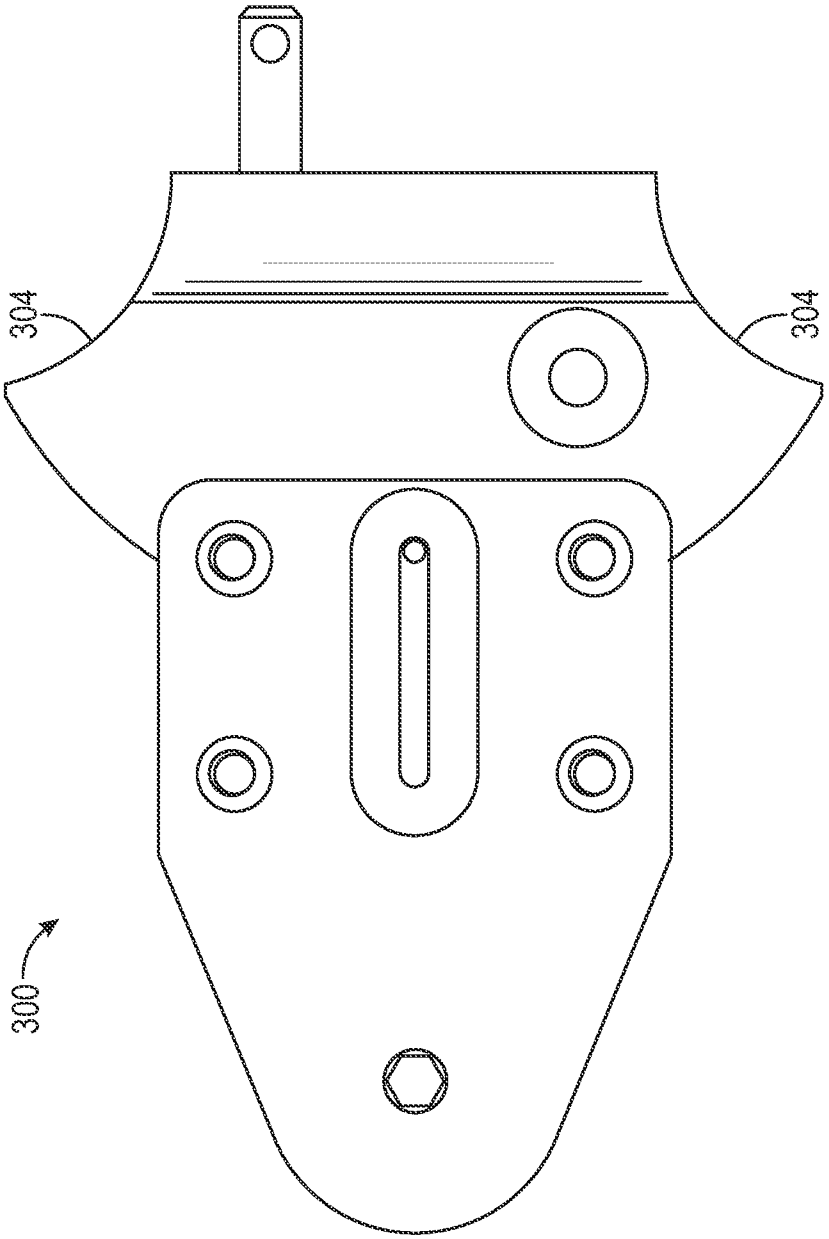
FIG. 11 is a top view of the tool body component shown in FIG. 10.

FIGS. 1-7 will be referenced below to describe one embodiment of a line-type auto glass cutout tool within the scope of the present invention, together with methods according to the invention. FIGS. 8 and 9 will be referenced below to describe an alternative embodiment of a line-type auto glass cutout tool in accordance with the invention. FIGS. 10 and 11 will be used to describe another alternative embodiment of a line-type auto glass cutout tool in accordance with the present invention.

Figure 1:
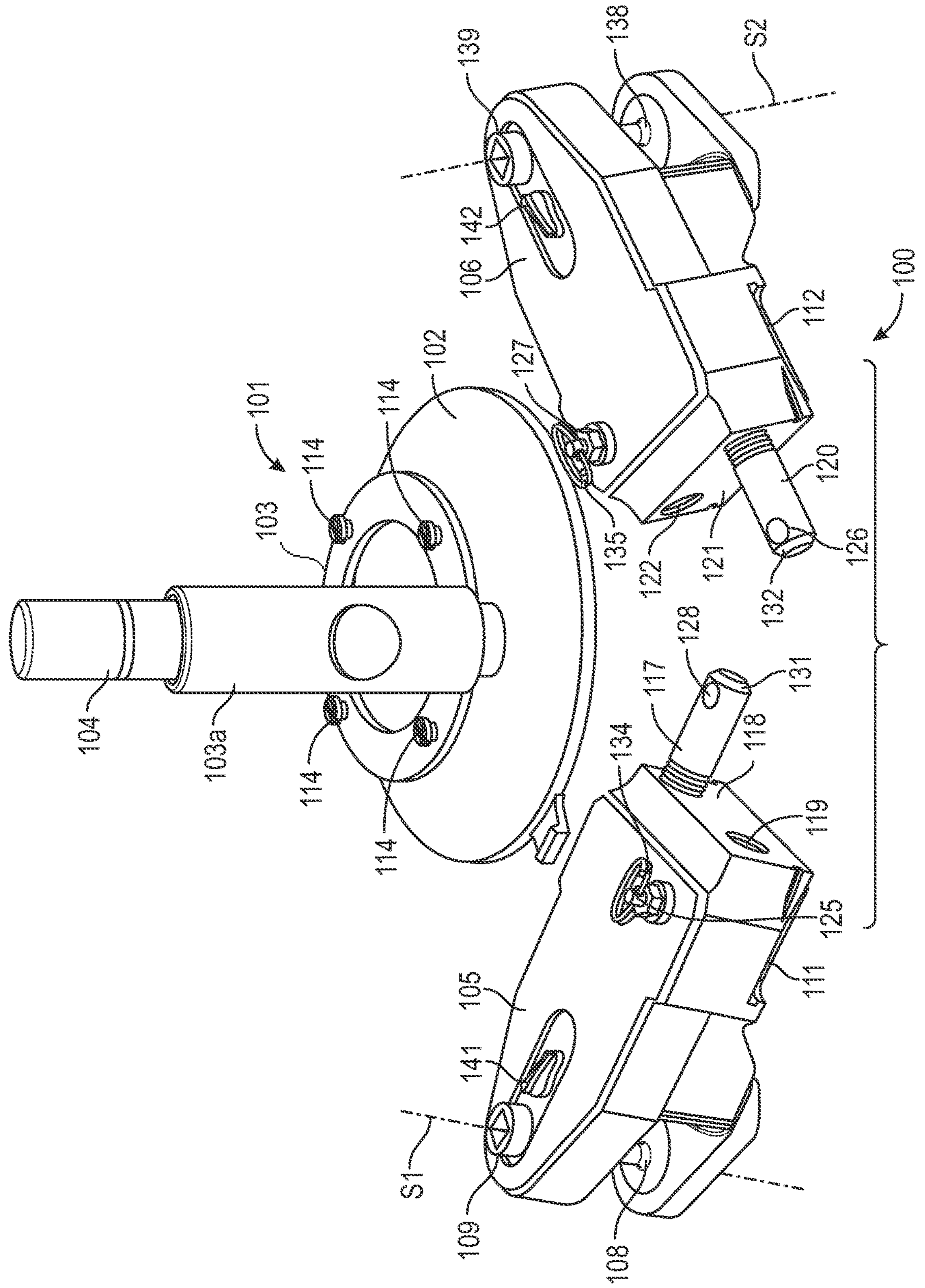
FIG. 1 is an isometric view showing a line-type auto glass cutout tool according to one aspect of the invention, separated into a first tool body component and a second tool body component, and shown with an independent vacuum cup device.
Figure 2:
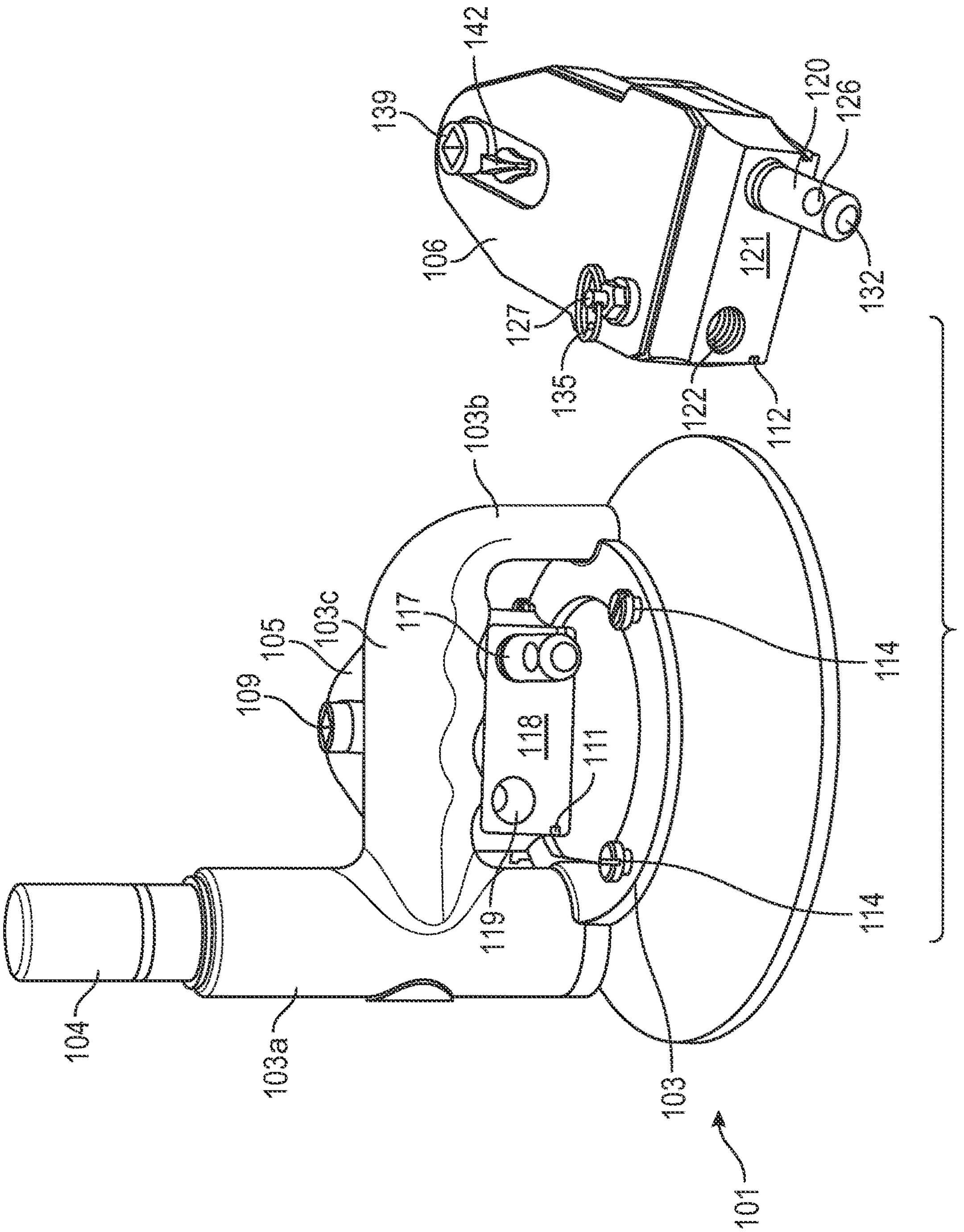
FIG. 2 is an isometric view of the vacuum cup device shown in FIG. 1, rotated 90 degrees with respect to the position in FIG. 1 and with the first tool body component received on the vacuum cup device in a first-side operating position and the second tool body component shown in a detached state.
Figure 3:
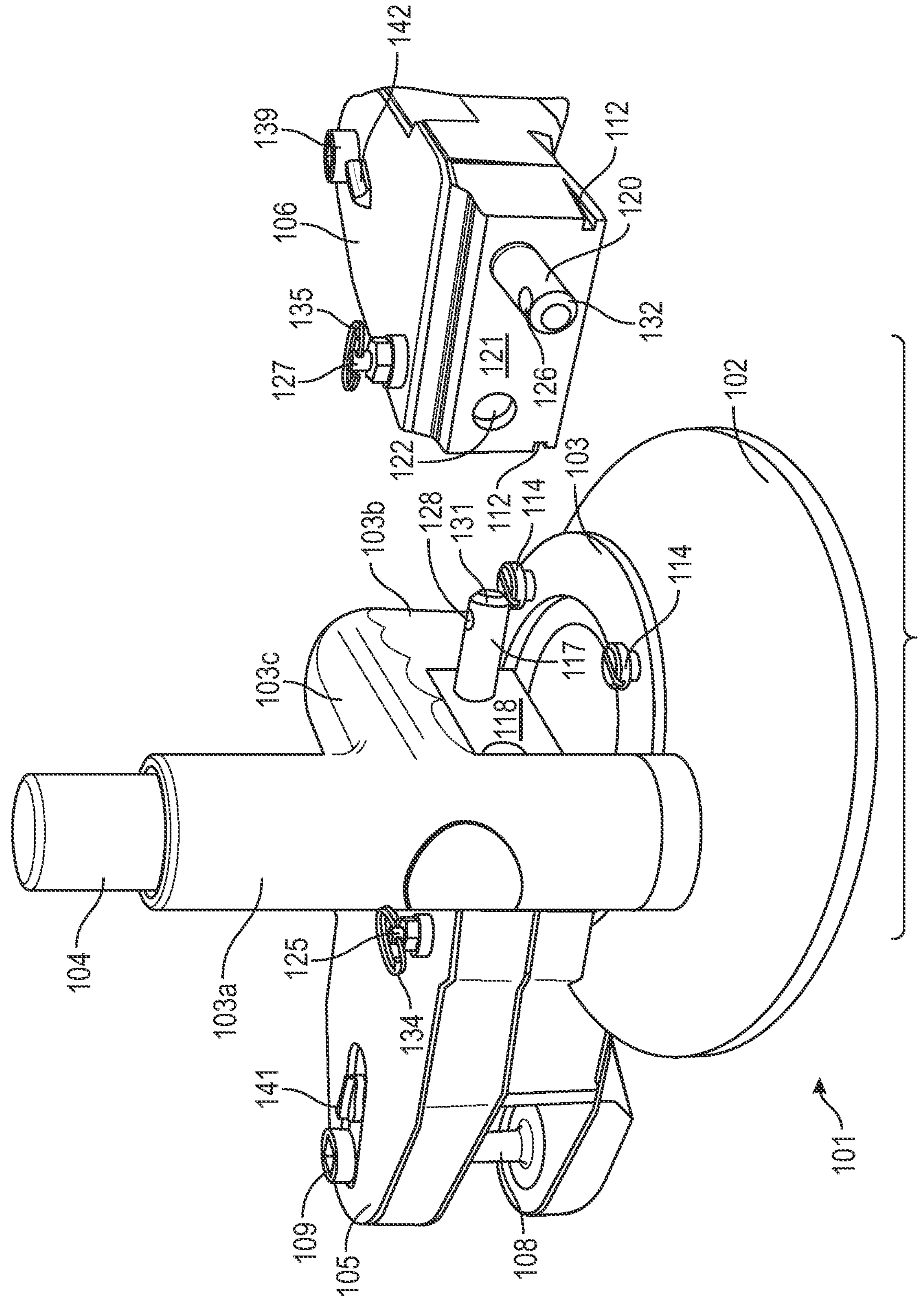
FIG. 3 is an isometric view showing the vacuum cup device of FIG. 1, rotated approximately 90 degrees with respect to the position shown in FIG. 2 and with the first tool body component received on the vacuum cup device in a first-side operating position and the second tool body component shown in a detached state.
Figure 4:
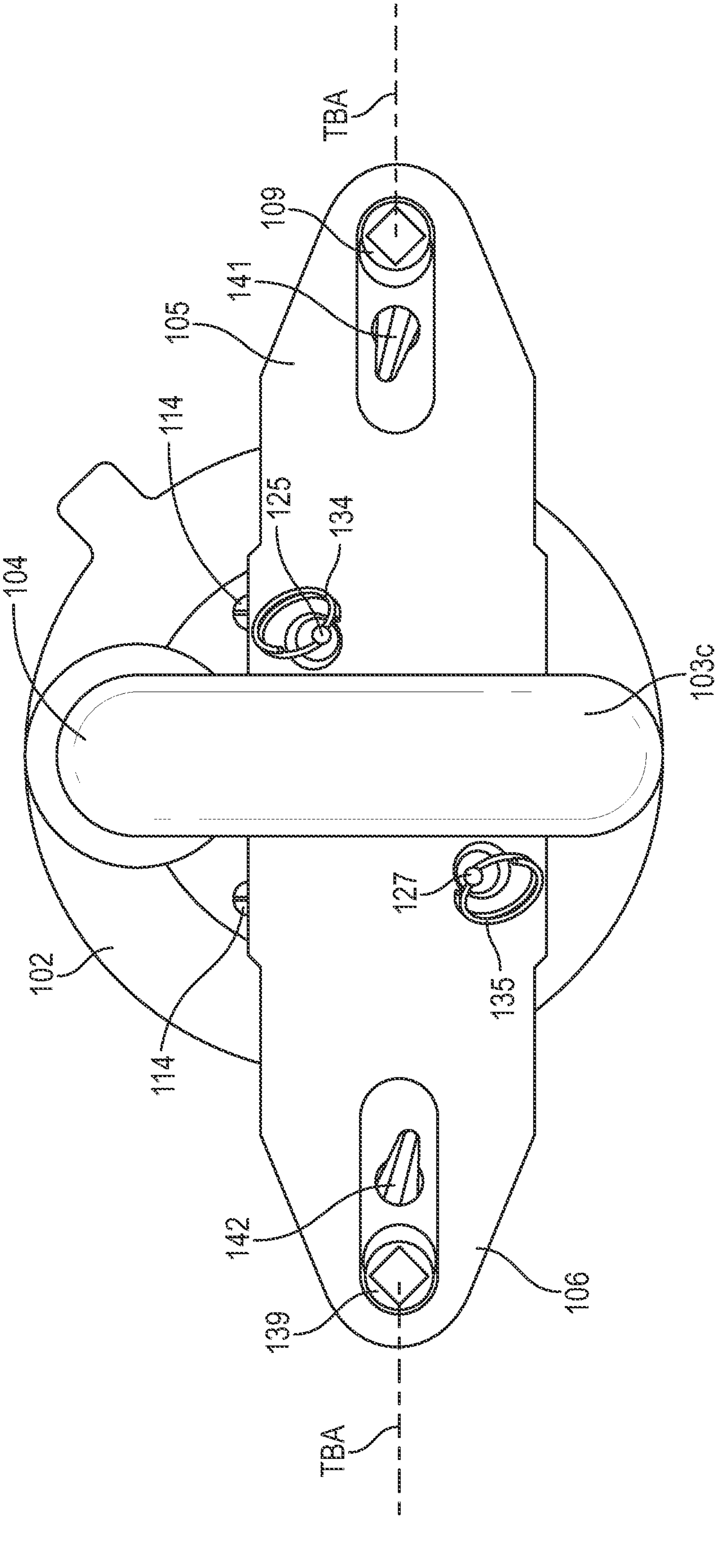
FIG. 4 is top plan view showing the first and second tool body components of FIG. 1 in a connected position to form a tool body connected in a tool operating position on the base of the vacuum cup device shown in FIG. 1.
Figure 5:
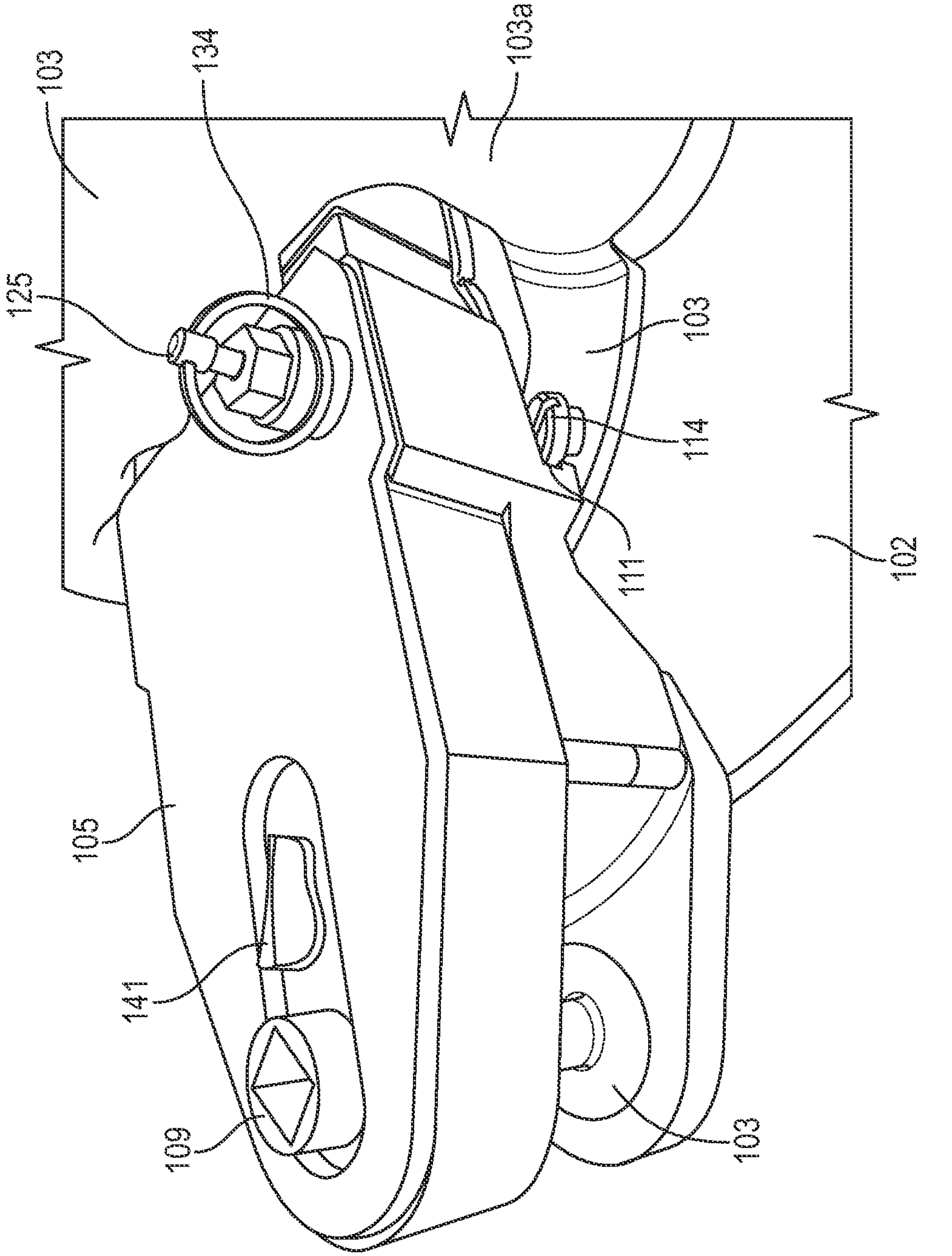
FIG. 5 is an isometric view of the first tool body component shown in FIG. 1 and a portion of the vacuum cup device with the first tool body component received on the base of the vacuum cup device in the first-side operating position.
Figure 6:
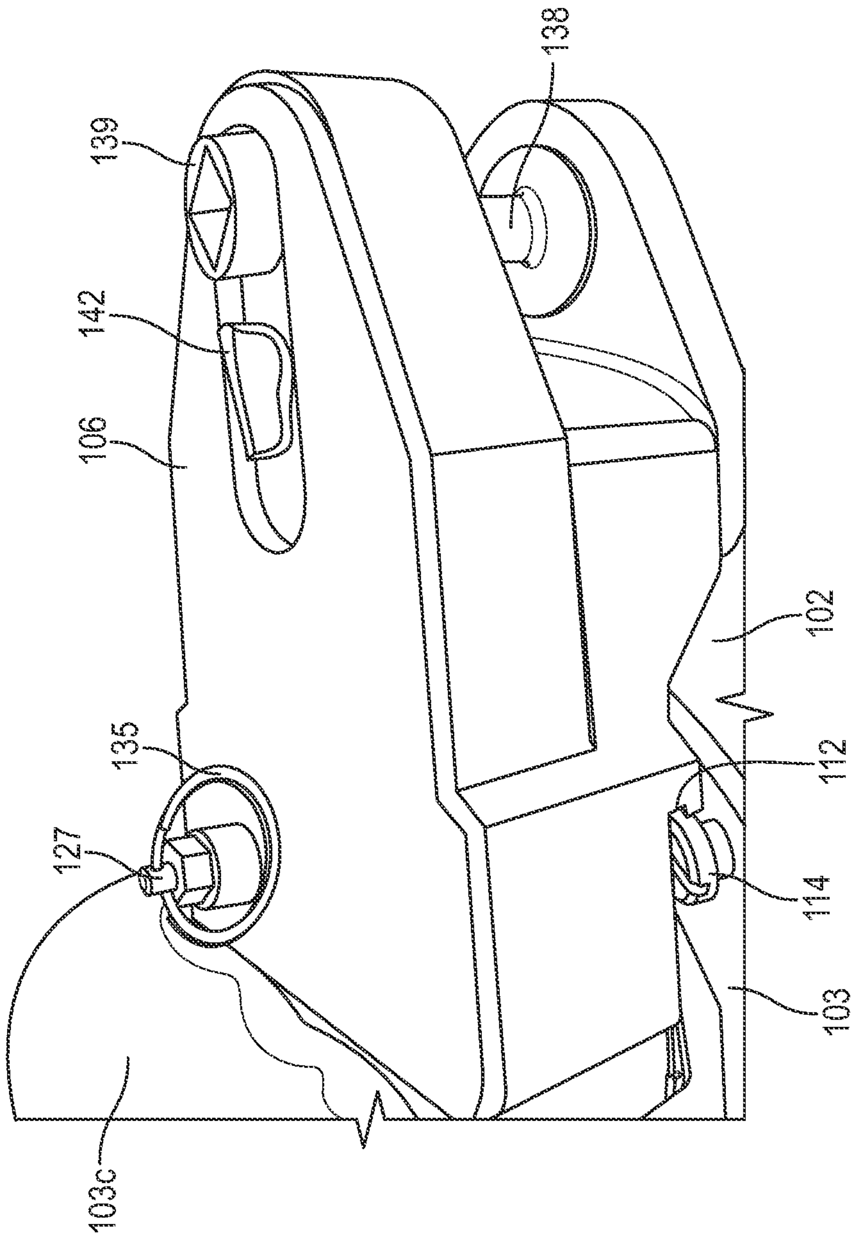
FIG. 6 is an isometric view of the second tool body component shown in FIG. 1 and a portion of the vacuum device with the second tool body component received on the base of the vacuum cup device in the second-side operating position.

FIG. 1 shows a line-type auto glass cutout tool 100 for use with a vacuum cup device 101 having a vacuum cup 102 and a base 103 connected to the vacuum cup. As best shown in FIGS. 1-3 the vacuum cup device base 103 includes a ring-shaped part connected by screws 114 to the vacuum cup 102. The vacuum cup device 101 further includes a first upright part 103*a* that houses a portion of a pump 104, a second upright part 103*b*, and a grip part 103*c*, the latter forming a structure by which the vacuum cup device 101 may be grasped in one hand. The tool 100 includes a tool body, in this case made up of first and second tool body components 105 and 106 shown separated in the FIG. 1. A first winding spool 108 is mounted on the tool body (in this example first tool body component 105) for rotation about a first spool axis 51 relative to the tool body. A first drive element 109 is coupled to the first winding spool 108 to rotate with the first winding spool about the first spool axis 51. The auto glass cutout tool 100 also includes an attachment arrangement for releasably securing the tool body (made up of components 105 and 106) to the vacuum cup device 101 in a tool operating position (shown in FIG. 4). In the example of the tool 100 shown in FIG. 1 in which the first and second tool body components 105 and 106 are adapted to connect together to form the tool body, the attachment arrangement includes a tool body component connector system adapted to releasably connect the first tool body component to the second tool body component. The term "releasably" in this sense means configured to be released either with or without tools but without damaging or modifying the structure of the tool body or vacuum cup device base 103.

Figure 7:
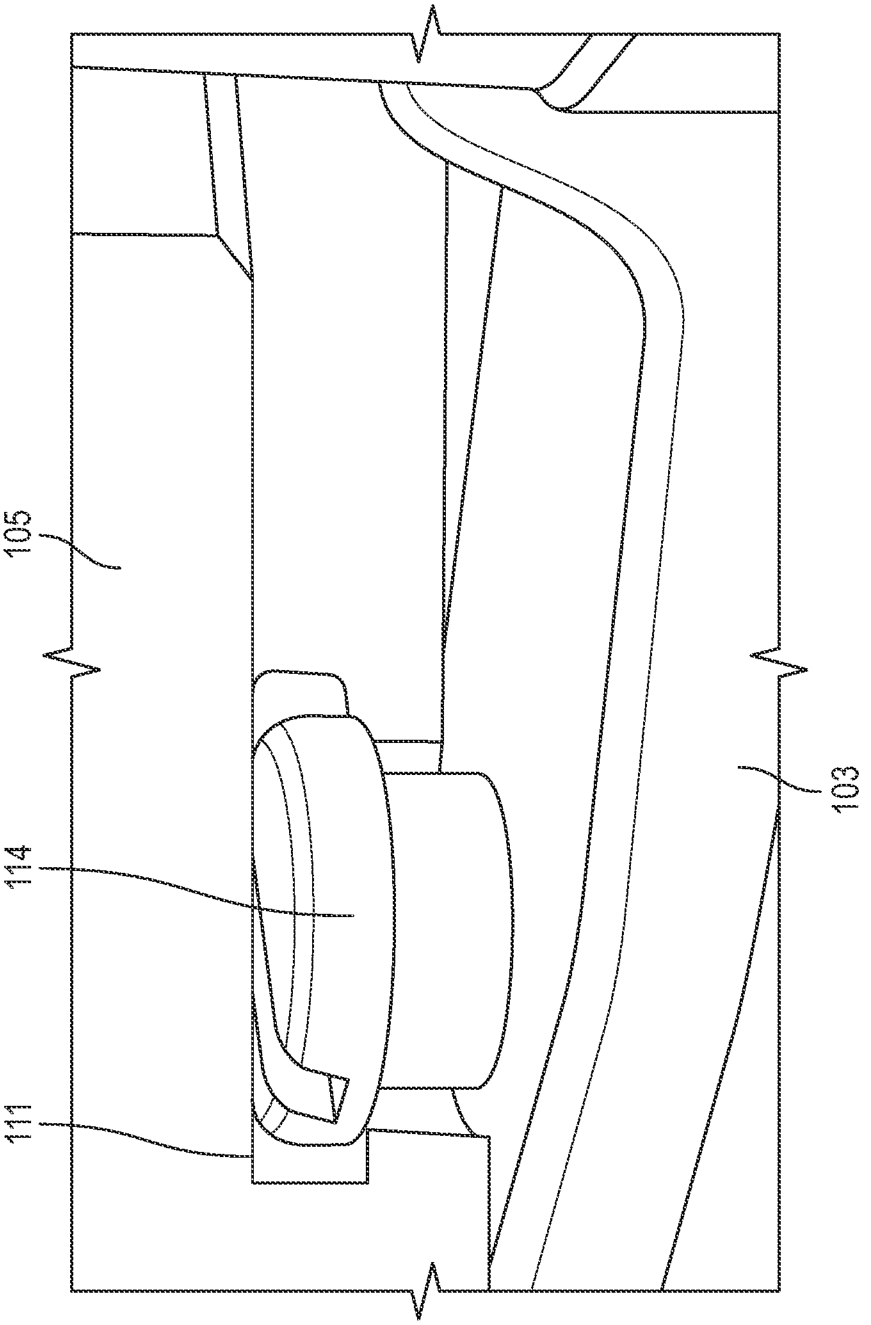
FIG. 7 is an isometric view showing a T-shaped feature of the vacuum cup device received in a corresponding slot formed on the first tool body component when the first tool body is in the first-side operating position.

The attachment arrangement in the example of FIGS. 1-7, that is the arrangement that releasably secures the tool body to the vacuum cup base 103, also includes one or more first-side connecting features 111 formed on the first tool body component 105 and one or more second-side connecting features 112 formed on the second tool body component 106. Each of these first and second-side connecting features, 111 and 112, respectively, is adapted to cooperate with a respective feature 114 of the vacuum cup device base 103 to connect the tool body to the base 103 of the vacuum cup device 102 in the tool operating position. In this example, each of the first-side and second-side connecting features 111 and 112 includes a receiving channel or slot adapted to receive a feature 114 comprising a T-shaped element projecting from the base 103. As best shown in the view of FIG. 3 and the view of FIG. 7, the T-shaped elements comprise stand-off screws that connect the base 103 to the vacuum cup 102 but have a screw head that does not lie flush against the base 103. Thus the head of each screw forms the top of the T-shape and the upper portion of the screw body (shank) forms the base of the T-shape. These stand-off screws may replace the standard screws of the vacuum cup device to provide the T-shaped feature. The corresponding shape of the channel or slot comprising the connecting features 111 and 112 is best shown in FIGS. 3 and 7. The illustrated channel shape of connecting features 111 and 112 captures only a portion of the T-shaped element (feature 114 in this embodiment) in order to provide a good connection between the tool body and the base 103. Also, as is apparent from FIGS. 1 and 2 the first tool body component 105 includes two connecting features 111, each comprising a channel for receiving a different feature 114 comprising a T-shaped element. The second tool body 106 similarly includes two connecting features 112, each comprising a channel for receiving a different feature 114 comprising a T-shaped element. When placed in the desired operating position on base 103, the connecting features 111 or 112 of the respective tool body component 105 or 106 capture the T-shaped elements at the lateral sides of the tool body component. The connection between the two tool body components 105 and 106 then releasably secures each in place on the vacuum cup device base 103. Disconnecting the two tool body components 105 and 106 allows each tool body component to be slid outwardly from the base along a tool body axis TBA shown in FIG. 4 to allow the channel-type connecting features 111 and 112 to be moved relative to the captured T-shaped elements comprising features 114 until those features are no longer in the respective channel and the tool body component can be completely separated from the base 103.

The tool body component connector system that facilitates the connection and disconnection of the tool body components 105 and 106 may include a set of features configured to interlock when the tool body components are connected together. The example tool 100 includes a first connector element 117 extending from a connecting face 118 of the first tool body component 105, and a first receiver element 119 formed in the connecting face 118 of the first tool body component 105. Similarly, the second tool body component 106 includes a second connector element 120 extending from a connecting face 121 of the second tool body component and a second receiver element 122 formed in the connecting face 121 of the second tool body component 106. The second connector element 120 is adapted to be received in the first receiver 119 when the first tool body component 105 and second tool body component 106 are in the connected position to form the tool body, and the second receiver 122 is adapted to receive the first connector element 117 when the first tool body component and second tool body component are in the connected position to form the tool body. Once the two tool body components 105 and 106 are connected together with the two connector elements 117 and 120 received in the complementary receiver 122 and 119, the tool body components may be secured in that position by any suitable means. In the example of FIGS. 1-7, the tool body components 105 and 106 are secured by a respective locking pin. In particular, the tool 100 includes a first locking pin 125 mounted on the first tool body component 105 and adapted to releasably lock the second connector element 120 in the first receiver element 119 by cooperation with a pin opening 126 in the second connector element 120. Similarly, a second locking pin 127 is mounted on the second tool body component 106 and adapted to releasably lock the first connector element 117 in the second receiver element 122 by cooperation with a pin opening 128 in the first connector element 117. The locking pins 125 and 127 may be spring loaded in the respective tool body component so as to be biased into the respective pin opening 128 and 126. Each connector element 117 and 120 can have a beveled end 131 and 132, respectively, so that the respective locking pin 125 and 127 is displaced against the spring bias as the respective connector element is inserted into the respective receiver 119 and 122. The spring bias then forces the pin 125 and 127 into the respective pin opening 128 and 126 once the pin opening aligns with the pin. To release the two tool body components 105 and 106 from the connected position, the pins 125 and 127 may be pulled outwardly by the respective ring 134 and 135 to allow the received connector element 117 and 120 to be withdrawn from the respective receiver 119 and 122.

The example tool 100 shown in FIGS. 1-7 includes a second winding spool 138 mounted on the second tool body component 106 for rotation about a second spool axis S2 relative to the tool body, which, in this case, extends approximately parallel to the first spool axis 51 when the tool body components 105 and 106 are in the connection position to form the tool body. A second drive element 139 is coupled to the second winding spool to rotate with the second winding spool about the second spool axis. As with the first winding spool 108, the second winding spool 138 may be mounted for rotation on any suitable bearing or bushing arrangement. Each winding spool 108 and 138 may be rotated about its respective axis 51 and S2 to wind a suitable auto glass cutout line in a glass removal operation. The drive elements 109 and 139 are provided for attaching a suitable tool, either a hand-operated tool or a power tool, for rotating the respective winding spool.

Each winding spool in the example tool 100 shown in FIGS. 1-7 is also associated with a respective locking device for locking the winding spool in place about its axis of rotation. In particular, tool 100 includes a first winding spool locking device 141 mounted on the first tool body component 105 for selectively locking the first winding spool 108 in place to prevent the first winding spool from rotating about first spool axis 51. A second winding spool locking device 142 is mounted on the second tool body component 106 for selectively locking the second winding spool 138 in place to prevent the second winding spool from rotating about the second spool axis S2. It will be appreciated that the element called out as the respective locking device 141 and 142 is a lever which is used to actuate the locking device. The locking device may include a cam, pin, or any other element (not shown in the current images) that may be extended to interfere with the rotation of the respective winding spool and drive element. Also, the locking device may incorporate a ratchet mechanism that allows rotation in one direction but not in the other, and preferably a switchable rachet mechanism that is operable to switch the direction of the ratcheting action between either direction of rotation.

A method of securing the line-type auto glass cutout tool 100 on vacuum cup device 101 includes placing the first tool body component 105 in a first-side operating position shown best in FIGS. 2-5 in contact with a first-side feature of the vacuum cup device 101, in this case first-side feature 114 each comprising one of the T-shaped elements. The method further includes placing the second tool body component 106 in a second-side operating position (shown in FIGS. 4 and 6) in contact with a second-side feature of the vacuum cup device 101, in this case the second-side feature 114 comprising one of the T-shaped elements on that side of the base 103. While the first tool body component 105 resides approximately in the first-side operating position and the second tool body component 106 resides approximately in the second-side operating position, the method further includes releasably connecting the first tool body component 105 to the second tool body component 106. This releasable connection between the first tool body component 105 and second tool body component 106 retains the first tool body component 105 in contact with the first-side feature 114 of the vacuum cup device 101 and retains the second tool body component 106 in contact with the second-side feature 114 of the vacuum cup device 101.

In this example where the first-side feature includes a first T-shaped projection, placing the first tool body component 105 in the first-side operating position includes sliding the channel comprising the first-side connecting feature 111 formed on the first tool body component 105, onto the respective T-shaped projection comprising base feature 114. The same sliding connection applies as well to the second tool body component 106, sliding the channel comprising the second-side connecting feature 112 onto the respective T-shaped projection comprising a base feature 114. In the example of FIGS. 1-7 where there are two first-side connecting features 111 and two second-side connecting features 112, placing the respective tool body component 105 and 106 in the its operating position also places each respective channel/connecting feature 111 and each respective channel/connecting feature 112 in contact with a respective feature 114 of the base (the respective feature 114 comprising a respective T-shaped projection).

FIGS. 8 and 9 show an alternate line-type auto glass cutout tool 200 adapted to be mounted on a vacuum cup device similar to device 101. Tool 200 includes essentially the same configuration and components generally as tool 100 shown in FIGS. 1-7. In particular, tool 200 is made up of a first tool body component 205 and second tool body component 206 shown in FIG. 8 connected by an attachment arrangement in a connected position, and in FIG. 9 in the connected position in a tool operating position on vacuum cup device 101. Differences between tool 200 and tool 100 include a different type of drive element 209 for the first winding spool 208 and a different type of drive element 210 for second winding spool 211. Whereas the drive elements 109 and 139 in tool 100 comprises a square receiver similar to that found on a bolt driving socket, the drive elements 209 and 210 of tool 200 each comprise a hex shaped shaft that may be received in the chuck of a powered rotary driver or a hex-shaped receiver of a suitable tool that itself may be received in the chuck of a powered rotary driver or received in some other tool by which a torque may be applied ultimately to the respective driving spool.

Another difference between tool 200 and tool 100 includes a different type of locking mechanism. Whereas tool 100 includes a lever-operated locking device 141 for the tool body component 105 and a lever-operated locking device 142 for the tool body component 106, tool 200 includes a slide-operated locking device 215 for first tool body component 205 and a slide-operated locking device 216 for the second tool body component 206. Such a slide-operated locking device 215 and 216 may include an element (not shown in these views) within the respective component that may be slid into contact with a feature of the respective spool or shaft associated therewith to prevent the spool from turning.

FIGS. 10 and 11 show another alternate embodiment of a tool body component 300, that comprises one of two such components that may be connected together to form a tool body similar to that shown for tool 100 and tool 200. As compared to tool body components 105 and 106 for tool 100 and tool body components 205 and 206 for tool 200, tool body component 300 in FIGS. 10 and 11 includes an additional type of feature to help secure the tool in an operating position on a vacuum cup device such as device 101 in FIGS. 1 and 2. In addition to the connecting feature 302 comprising a slot or channel correspond to features 111 and 112 for tool 100, tool body component 300 includes a concave curved surface 304 that is placed against a convex curved surface of the vacuum cup device when the tool body component 300 is placed in an operating position on the vacuum cup device. Tool body component 300 includes two such concave curved surfaces 304, each adapted to reside against a convex surface of the vacuum cup device 101, particularly a respective upright portion 103*a* or 103*b* of the vacuum cup device 101. The concave curved surfaces 304 may comprise or include resilient elements to help grip the respective upright portion of the vacuum cup device. It will be appreciated that a second tool body component similar to component 300 may be adapted to connect to component 300 on the opposite side of the vacuum cup device in a fashion similar to that shown for tools 100 and 200 to grip the upright portions of the vacuum cup device from the opposite side and thereby provide a secure connection to the vacuum cup device. Features 304 in some implementations may replace the channel features 111 and 112 shown in the example tool 100 of FIGS. 1-7.

Another advantage of the tools such as tool 100 which may be disconnected into tool body components (such as tool body components 105 and 106), each with a respective winding spool, is that the individual tool body components may be secured via a suitable adapted to a vehicle for use in removing certain types of glass panels such as quarter glass panels for example.

The various components of a line-type auto glass cutout tool according to the present invention may be formed from any suitable material or combination of materials. The tool body and the various components on the tool body such as the spool(s) and drive element may be made from suitable metals or rigid plastics. Surfaces such as the concave surfaces shown in FIGS. 10 and 11 may include a resilient material layer to provide grip against the corresponding surfaces of the vacuum cup device.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as top, bottom, upper, lower, and the like with reference to a given feature are intended only to identify a given feature and distinguish that feature from other features. Unless specifically stated otherwise, such terms are not intended to convey any spatial or temporal relationship for the feature relative to any other feature.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, although specific tool body connector systems (including elements 117-122, 125-128, and 131-132 for tool 100) any suitable arrangement may be used to connect the two tool body components 105 and 106 for example together in a connected position and tool operating position on a vacuum cup device. Also, in some instances, one or more features disclosed in connection with one embodiment can be used alone or in combination with one or more features of one or more other embodiments. More generally, the various features described herein may be used in any working combination.

The invention claimed is:

1. A line-type auto glass cutout tool for use with a vacuum cup device having a vacuum cup and a base connected to the vacuum cup, the line-type auto glass cutout tool including:

(a) a tool body;

(b) a first winding spool mounted on the tool body for rotation about a first spool axis relative to the tool body;

(c) a first drive element coupled to the first winding spool to rotate with the first winding spool about the first spool axis; and (d) an attachment arrangement for releasably securing the tool body to the vacuum cup device in a tool operating position.

2. The line-type auto glass cutout tool of claim 1 further including:

(a) a first tool body component adapted to connect together with a second tool body component in a connected position to form the tool body; and (b) wherein the attachment arrangement includes a tool body component connector system adapted to releasably connect the first tool body component to the second tool body component.

3. The line-type auto glass cutout tool of claim 2 wherein the attachment arrangement includes:

(a) one or more first-side connecting features formed on the first tool body component, each first-side connecting feature adapted to cooperate with a respective feature of the vacuum cup device to connect the tool body to the vacuum cup device in the tool operating position; and (b) one or more second-side connecting features formed on the second tool body component, each second-side connecting feature adapted to cooperate with a respective feature of the vacuum cup device to connect the tool body to the vacuum cup device in the tool operating position.

4. The line-type auto glass cutout tool of claim 2 wherein:

(a) at least one first-side connecting feature comprises a channel adapted to slidingly receive a first-side T-shaped element of the base of the vacuum cup device when the first tool body component and second tool body component are connected together to form the tool body in the tool operating position with respect to the base of the vacuum cup; and (b) at least one second-side connecting feature comprises a channel adapted to slidingly receive a second-side T-shaped element of the base of the vacuum cup device when the first tool body component and second tool body component are connected together to form the tool body in the tool operating position with respect to the base of the vacuum cup.

5. The line-type auto glass cutout tool of claim 2 wherein the tool body component connector system includes:

(a) a first connector element extending from a connecting face of the first tool body component;

(b) a first receiver element formed in the connecting face of the first tool body component;

(c) a second connector element extending from a connecting face of the second tool body component and adapted to be received in the first receiver element when the first tool body component and second tool body component are in the connected position to form the tool body; and (d) a second receiver element formed in the connecting face of the second tool body component and adapted to receive the first connector element when the first tool body component and second tool body component are in the connected position to form the tool body.

6. The line-type auto glass cutout tool of claim 5 wherein the tool body component connector system includes:

(a) a first locking pin mounted on the first tool body component and adapted to releasably lock the second connector element in the first receiver element when the first tool body component and second tool body component are in the connected position to form the tool body; and (b) a second locking pin mounted on the second tool body component and adapted to releasably lock the first connector element in the second receiver element when the first tool body component and second tool body component are in the connected position to form the tool body.

7. The line-type auto glass cutout tool of claim 2 further including:

(a) a second winding spool mounted on the tool body for rotation about a second spool axis relative to the tool body; and (b) a second drive element coupled to the second winding spool to rotate with the second winding spool about the second spool axis.

8. The line-type auto glass cutout tool of claim 7 wherein:

(a) the first winding spool is mounted on the first tool body component; and (b) the second winding spool is mounted on the second tool body component.

9. The line-type auto glass cutout tool of claim 8 wherein the first spool axis extends approximately parallel to the second spool axis when the first tool body component and second tool body component are connected together in the connected position to form the tool body.

10. The line-type auto glass cutout tool of claim 8 further including:

(a) a first winding spool locking device mounted on the first tool body component for selectively locking the first winding spool in place to prevent the first winding spool from rotating about the first spool axis; and (b) a second winding spool locking device mounted on the second tool body component for selectively locking the second winding spool in place to prevent the second winding spool from rotating about the second spool axis.

11. A method of securing a line-type auto glass cutout tool on a vacuum cup device which includes a base, a vacuum cup connected to the base, and a vacuum pump connected to the base and operable to apply a vacuum to the volume defined by the vacuum cup, the method including:

(a) placing a first tool body component of the line-type auto glass cutout tool in a first-side operating position in contact with a first-side feature of the vacuum cup device, the first tool body component including (i) a first winding spool mounted thereon for rotation about a first spool axis relative to the first tool body component, and (ii) a first drive element coupled to the first winding spool to rotate with the first winding spool about the first spool axis;

(b) placing a second tool body component of the line-type auto glass cutout tool in a second-side operating position in contact with a second-side feature of the vacuum cup device; and (c) while the first tool body component resides approximately in the first-side operating position and the second tool body component resides approximately in the second-side operating position, releasably connecting the first tool body component to the second tool body component so that the connection between the first tool body component and second tool body component retains the first tool body component in contact with the first-side feature of the vacuum cup device and retains the second tool body component in contact with the second-side feature of the vacuum cup device.

12. The method of claim 11 wherein the first-side feature includes a first T-shaped projection and placing the first tool body component in the first-side operating position includes sliding a channel formed on the first tool body component onto the first T-shaped projection.

13. The method of claim 11 wherein placing the first tool body component in the first-side operating position also places the first tool body component in contact with at least one additional first-side feature of the vacuum cup device which is spaced apart from the first-side feature of the vacuum cup device.

14. The method of claim 13 wherein placing the second tool body component in the second-side operating position also places the second tool body component in contact with at least one additional second-side feature of the vacuum cup device which is spaced apart from the second-side feature of the vacuum cup device.

15. The method of claim 14 wherein the at least one additional first-side feature and the at least on additional second-side feature includes a respective T-shaped projection.

16. The method of claim 11 wherein the first-side feature includes a first first-side convex curved surface of the vacuum cup device and wherein placing the first tool body component in the first-side operating position includes placing a first concave curved surface of the first tool body component against the first first-side convex curved surface.

17. The method of claim 16 wherein the second-side feature includes a first second-side convex curved surface of the vacuum cup device and wherein placing the second tool body component in the second-side operating position includes placing a first concave curved surface of the second tool body component against the first second-side convex curved surface.

18. The method of claim 17 wherein:

(a) the first-side feature includes a second first-side convex curved surface of the vacuum cup device spaced apart from the first first-side convex curved surface;

(b) placing the first tool body component in the first-side operating position includes placing a second concave curved surface of the first tool body component against the second first-side convex curved surface;

(c) the second-side feature includes a second second-side convex curved surface of the vacuum cup device spaced apart from the first second-side convex curved surface; and (d) placing the second tool body component in the second-side operating position includes placing a second concave curved surface of the second tool body component against the second second-side convex curved surface.

* * * * *